(12) United States Patent
Davis et al.

(10) Patent No.: US 6,847,493 B1
(45) Date of Patent: Jan. 25, 2005

(54) OPTICAL BEAMSPLITTER WITH ELECTRO-WETTING ACTUATION

(75) Inventors: John P Davis, Bountiful, UT (US); Timofei Nikita Kroupenkine, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/637,837

(22) Filed: Aug. 8, 2003

(51) Int. Cl.$^7$ .............................................. G02B 1/06
(52) U.S. Cl. .................................. 359/665; 359/618
(58) Field of Search .............................. 359/665, 642, 359/618, 620, 666, 245

(56) References Cited

U.S. PATENT DOCUMENTS

| | | | |
|---|---|---|---|
| 3,670,130 A | 6/1972 | Greenwood et al. | 200/183 |
| 4,030,813 A | 6/1977 | Kohashi et al. | 350/161 |
| 4,118,270 A | 10/1978 | Pan et al. | 156/659 |
| 4,137,060 A | 1/1979 | Timmermann | 65/31 |
| 4,338,352 A | 7/1982 | Bear et al. | 427/8 |
| 4,406,732 A | 9/1983 | Kayoun | 156/626 |
| 4,569,575 A | 2/1986 | Le Pesant et al. | 350/355 |
| 4,653,847 A | 3/1987 | Berg et al. | 350/96.2 |
| 4,671,609 A | 6/1987 | Khoe et al. | 350/96.18 |
| 4,708,426 A | 11/1987 | Khoe | 350/96.18 |
| 4,867,521 A | 9/1989 | Mallinson | 350/96.18 |
| 4,948,214 A | 8/1990 | Hamblen | 350/413 |
| 5,412,746 A | 5/1995 | Rossberg et al. | 385/48 |
| 5,486,337 A | 1/1996 | Ohkawa | 422/100 |
| 5,518,863 A | 5/1996 | Pawluczyk | 430/321 |
| 5,659,330 A | 8/1997 | Sheridan | 345/84 |
| 6,014,259 A | 1/2000 | Wohlstadter | 359/619 |
| 6,369,954 B1 | 4/2002 | Berge et al. | 359/666 |
| 6,449,081 B1 * | 9/2002 | Onuki et al. | 359/245 |
| 6,538,823 B2 | 3/2003 | Kroupenkine et al. | 359/620 |
| 6,545,815 B2 | 4/2003 | Kroupenkine et al. | 359/665 |
| 6,545,816 B1 | 4/2003 | Kroupenkine et al. | 359/665 |
| 6,665,127 B2 * | 12/2003 | Bao et al. | 359/665 |
| 6,674,940 B2 | 1/2004 | Kroupenkine | 385/33 |
| 6,778,328 B1 * | 8/2004 | Aizenberg et al. | 359/665 |

OTHER PUBLICATIONS

Abbott, N.L., Whitesides, G.M., *Potential–Dependent Wetting of Aqueous Solutions of Self–Assembled Monolayers Formed from 15–(Ferrocenylcarbonyl) pentadecanethiol on Gold*, Langmuir, vol. 10, No. 5, 1994, pp. 1493–1497.

\* cited by examiner

Primary Examiner—Hung Xuan Dang

(57) ABSTRACT

A tunable optical beamsplitter is disclosed that uses electrowetting techniques to vary the propagation characteristics of one or more light beams. Specifically, electrowetting principles are applied to a region of fluid enclosed within an enclosure to form a plurality of liquid lenses. When a light beam is incident upon the plurality of lenses, the plurality of lenses transforms portions of the light beam in corresponding plurality of output split beams. The region of fluid is controllably moved within the enclosure to modify at least a first optical characteristic of at least a first lens in said plurality of lenses in order to change the propagation characteristics of at least one of the split beams.

11 Claims, 10 Drawing Sheets

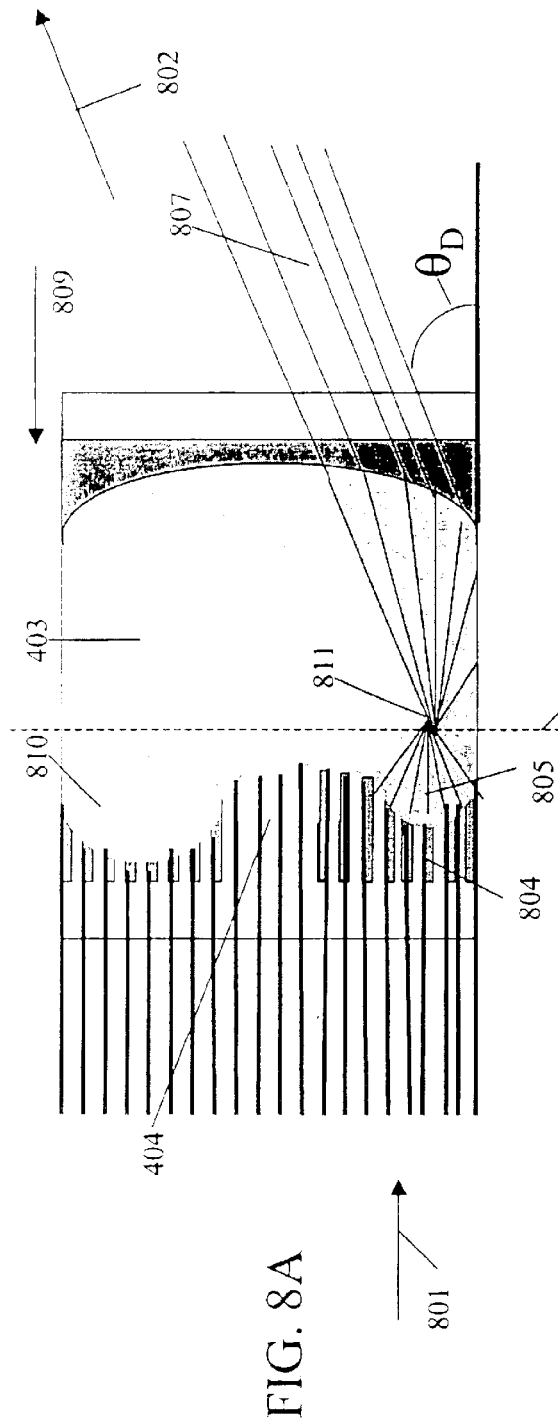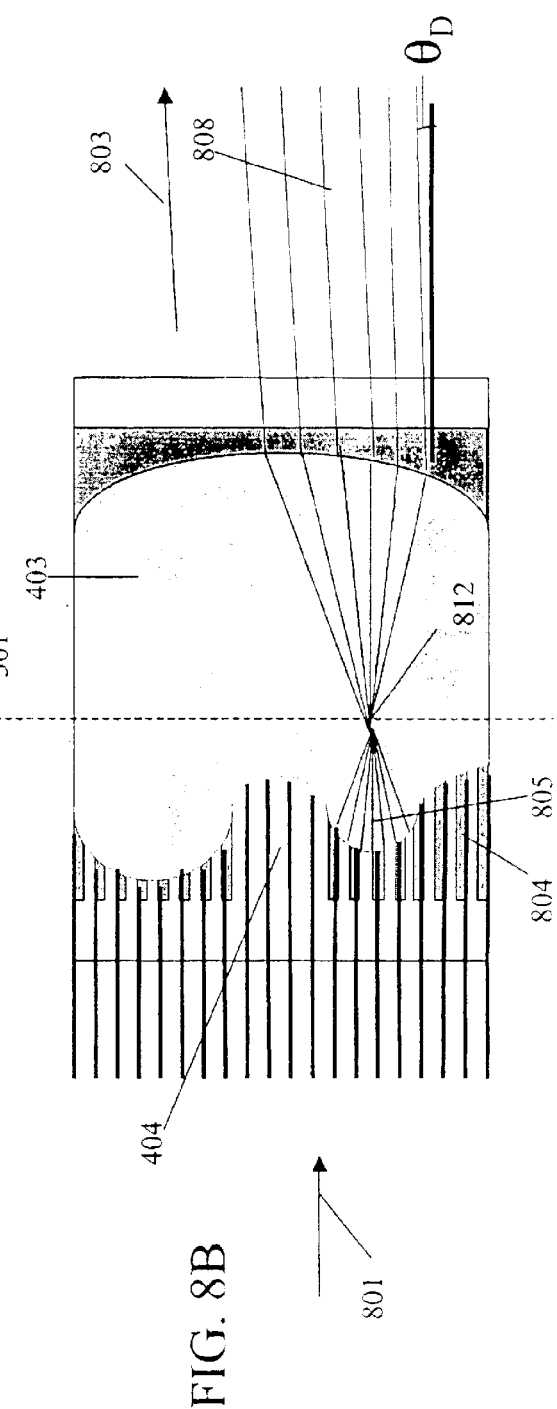
FIG. 8A
FIG. 8B

US 6,847,493 B1

OPTICAL BEAMSPLITTER WITH ELECTRO-WETTING ACTUATION

FIELD OF THE INVENTION

The present invention relates to optical networking components and, in particular, to optical beamsplitters tunable by electrowetting actuation of fluids.

BACKGROUND OF THE INVENTION

Optical signals are useful for many applications in modern communications systems. A typical optical communications system comprises a transmitter of optical signals (e.g., a laser-based transmitter that generates a desirable wavelength of light, such as 1550 nm), a length of transmission optical fiber coupled to the source, and a receiver coupled to the fiber for receiving the signals. One or more amplifying systems may be disposed along the fiber for amplifying the transmitted signal. Within the receiver or other components within such systems it is often desirable to split the propagation of a single optical light beam into two or more split light beams propagating in different directions (e.g., to different photodetectors). Optical beamsplitters have traditionally been used to accomplish this beam splitting function.

Typical optical beamsplitters are, illustratively, semi-reflective cubes and/or plates placed in the path of a propagating beam at a desired preset incidence angle relative to the beam. When positioned at such an incidence angle, the input beam arrives at the partially reflective surface of the beamsplitter at a certain angle in a way such that a portion of the beam is reflected in one direction while at least one other portion of the beam is permitted to pass through the beamsplitter in another direction. As one skilled in the art will recognize, the performance of these types of beamsplitters typically depends to a large degree on precise positioning of the beamsplitter in relation to the incoming light beam and the destination optical components.

SUMMARY OF THE INVENTION

While prior tunable optical beamsplitters are acceptable for many uses, they tend to be limited in certain regards. Specifically, prior beamsplitters are not tunable, i.e., once prior beamsplitters were fabricated, they were characterized by certain fixed optical properties such as an optimum incidence angle. Thus, any alteration (tuning) of the direction of travel of the split beams and/or the focal length of the beamsplitter required manual movement of the beamsplitter and or the addition of components (such as lenses) to alter the propagation characteristics of the light beam. The present inventors have recognized that, as optical communications systems become more advanced and complex, there is a growing need for new, cost-effective tunable optical beamsplitters and methods of using those devices for changing the propagation behavior of the resulting split light signals.

Therefore, the present inventors have invented a tunable optical beamsplitter that uses electrowetting techniques to form a plurality of lenses in a droplet of liquid disposed in an enclosure. Illustratively, when a light beam is incident upon the plurality of lenses, the plurality of lenses transforms portions of the light beam in corresponding plurality of output split beams. The region of fluid is controllably moved within the enclosure to modify at least a first optical characteristic of at least a first lens in said plurality of lenses in order to change the propagation characteristics of at least one of the split beams. In one embodiment, the first optical characteristic is the radius of curvature of at least one lens in the plurality which, when modified, changes the convergence or divergence of the corresponding output split beam (s). In a second embodiment, the first optical characteristic is the position of at least one of the lenses within the beamsplitter which, when modified, changes the direction of departure of the corresponding output split beam(s).

BRIEF DESCRIPTION OF THE DRAWING

FIG. 8 shows how an array of electrodes can be used in the beamsplitter of FIGS. 4A, 4B and 4C to vary the direction of travel of a split light beam.

DETAILED DESCRIPTION OF THE INVENTION

Figure 1:
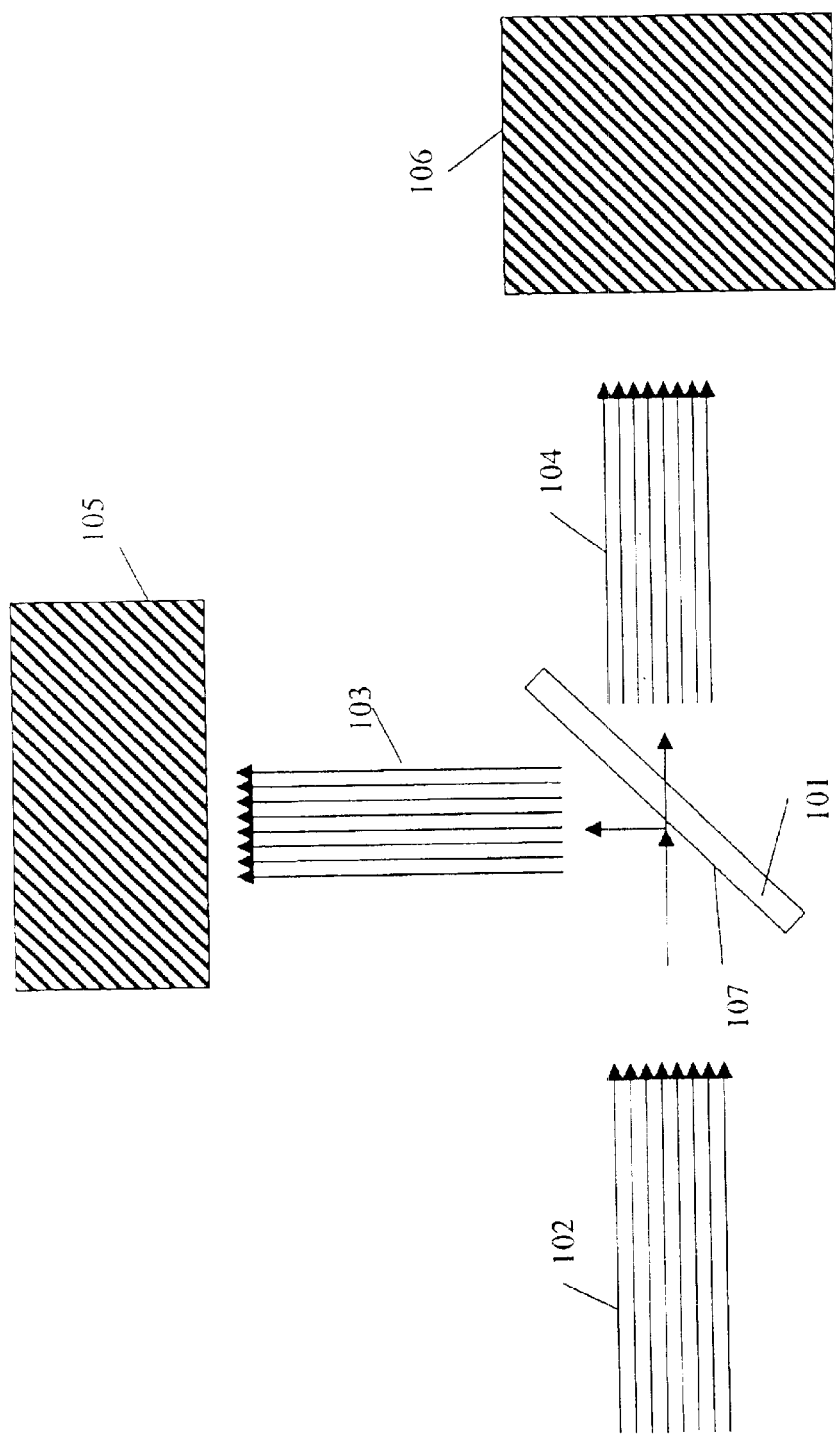
FIG. 1 shows an illustrative prior art use of a beamsplitter.

FIG. 1 shows an illustrative well-known prior art optical system wherein a beamsplitter is used to split a propagating optical beam into two split beams directed in different directions. In that figure, beamsplitter 101, which is illustratively disposed within an optical networking device, is placed in the path of an incoming propagating light beam 102. Surface 107 of beamsplitter 101 is partially reflective such that, when light beam 102 becomes incident upon surface 107 of beamsplitter 101, a portion 103 of light beam 102 is reflected toward device 105 and another portion 104 of light beam 102 passes through beamsplitter 101 toward device 106. Device 105 and device 106 are, illustratively, photodetectors in an optical receiver. As will be evident to one skilled in the art, beamsplitter 101 must be installed within the optical system of FIG. 1 in a way such that the beamsplitter is aligned with the incoming beam as well as devices 105 and 106. If the beamsplitter 101 becomes misaligned, physical realignment of the beamsplitter with the beam and devices is necessary. To date, this realignment was only possible by physically repositioning the beamsplitter device through the use of mechanical actuators and/or manual repositioning.

The present inventors have realized that it would be desirable to use optical beamsplitters that are tunable and that do not require physical repositioning of the beamsplitter device. Therefore, the present inventors have invented a tunable optical beamsplitter that uses electrowetting to vary the propagation characteristics (e.g., direction of travel and divergence) of one or more split light beams. The resulting devices consume little power (e.g., <1 milliwatt in some cases), are relatively inexpensive to produce, and are compatible with conventional optical systems. Electrowetting principles (i.e., using electric fields to variably change the properties of a liquid-based device) have previously been used to change the focal length and position of liquid microlenses. Such electrowetting based microlenses are the subject of copending U.S. patent application Ser. No. 10/135,973, entitled "Method and Apparatus for Aligning a Photo-Tunable Microlens" and copending U.S. patent application Ser. No. 10/139,124, entitled "Method and Apparatus for Calibrating a Tunable Microlens," both of which are hereby incorporated by reference herein. In their simplest form, electrowetting based microlenses use a transparent droplet of liquid to focus incoming light onto a desired focal spot.

Figure 2:
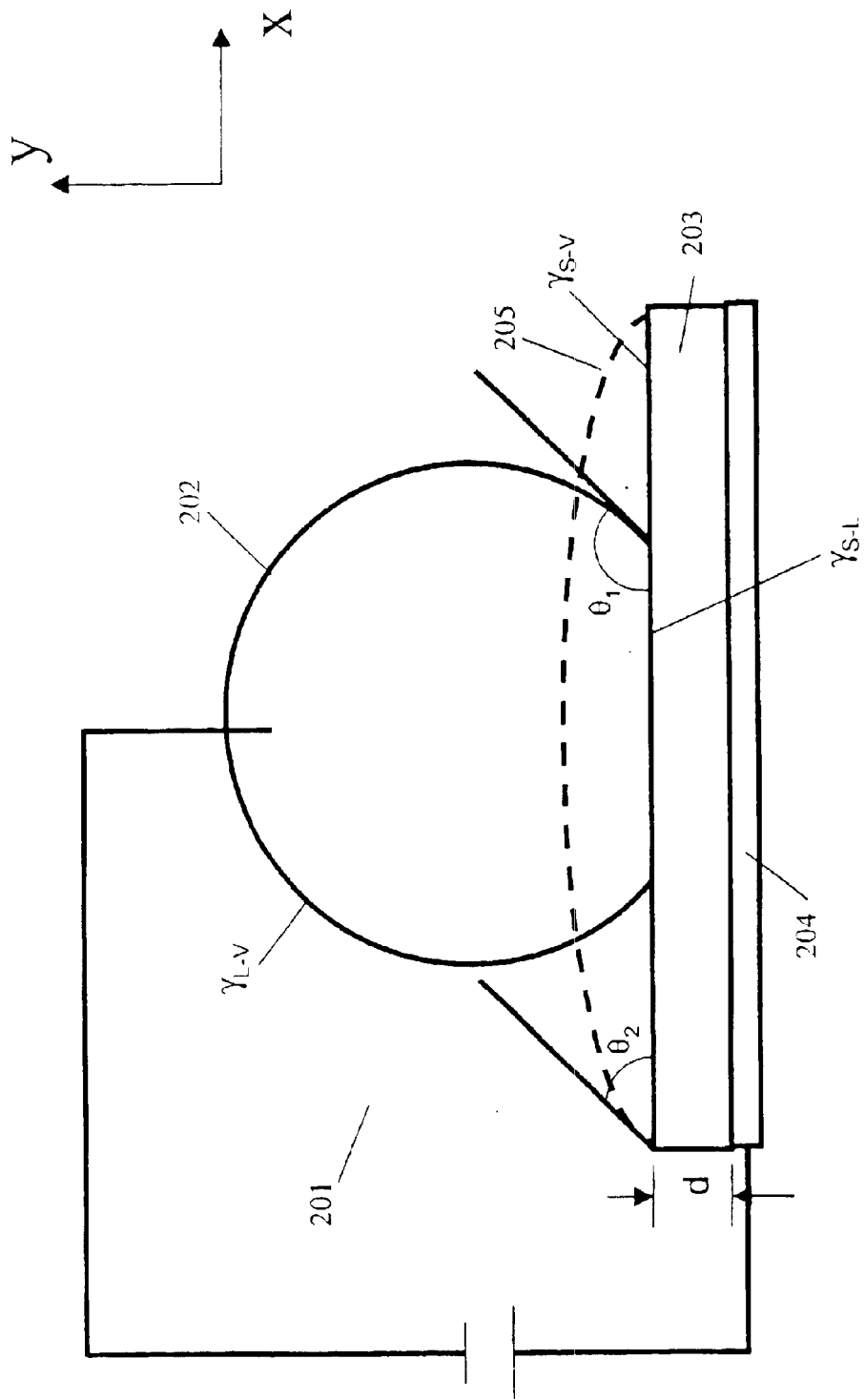
FIG. 2 shows a prior art liquid microlens using electrowetting principles to alter the optical properties of the microlens.

FIG. 2 shows one prior art embodiment of a simple liquid microlens 201, described in the '973 and '124 US Patent Applications referenced above, whereby the phenomenon of electrowetting may be used to reversibly change the contact angle θ between a droplet 202 of a conducting liquid (which may or may not be transparent) and a dielectric insulating layer 203 having a thickness "d" and a dielectric constant $\epsilon_r$. The contact angle θ between the droplet and the insulating layer is determined by interfacial surface tensions (also known as interfacial energy) "γ", generally measured in milli-Newtons per meter (mN/m). As used herein, $\gamma_{S-V}$ is the interfacial tension between the insulating layer 203 and the air, gas or other liquid that surrounds the droplet, $\gamma_{L-V}$ is the interfacial tension between the droplet 202 and the air, gas or other liquid that surrounds the droplet, and $\gamma_{S-L}$ is the interfacial tension between the insulating layer 103 and the droplet 202. The contact angle $\theta_1$ is determined by the following relationship:

$$\cos\theta_1 = \frac{\gamma_{S-V} - \gamma_{S-L}}{\gamma_{L-V}} \quad (1)$$

An electrode 204, such as metal electrode is positioned below the dielectric layer 203 and is insulated from the droplet 202 by that layer. The droplet 202 may be, for example, a water droplet, and the dielectric insulating layer 203 may be, for example, a Teflon/Parylene surface.

When no voltage difference is present between the droplet 202 and the electrode 204, the droplet 202 maintains its shape defined by the volume of the droplet and contact angle $\theta_1$, where $\theta_1$ is determined by the interfacial tensions γ as explained above. When a voltage V is applied to the electrode 204, the voltage difference between the electrode 204 and the droplet 202 causes the droplet to spread. The dashed line 205 illustrates that the droplet 202 spreads equally across the layer 203 from its central position relative to the electrode 204. Specifically, the contact angle θ decreases from $\theta_1$ to $\theta_2$ when the voltage is applied between the electrode 204 and the droplet 202. The voltage V necessary to achieve this spreading may range from several volts to several hundred volts. The amount of spreading, i.e., as determined by the difference between $\theta_1$ and $\theta_2$, is a function of the applied voltage V. The contact angle $\theta_2$ can be determined by the following relationship:

$$\cos\theta_2(V) = \cos\theta_1(V=0) + \frac{\epsilon_o \epsilon_r}{2d\gamma_{L-V}}V^2 \quad (2)$$

where $\theta_1$ is the contact angle between the insulating layer 203 and the droplet 202 when no voltage is applied between the droplet 202 and electrode 204; $\gamma_{L-V}$ is the droplet interfacial tension described above; $\epsilon_r$ is the dielectric constant of the insulating layer 203; and $\epsilon_0$ is $8.85 \times 10^{-12}$ F/M—the permittivity of a vacuum.

Figure 3:
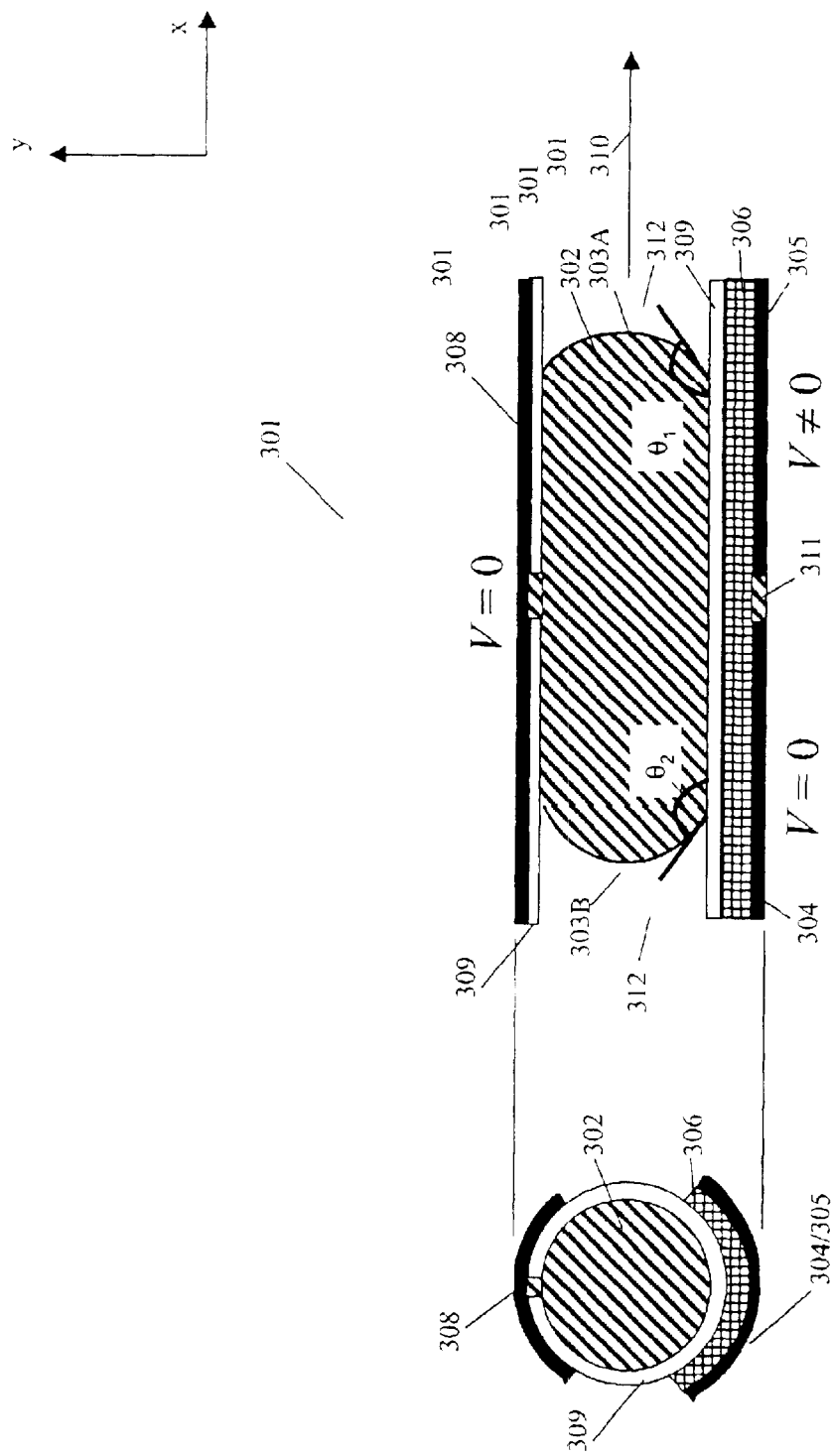
FIG. 3 shows a prior art liquid droplet enclosed in a channel wherein the droplet is movable using electrowetting principles.

FIG. 3 shows an embodiment of a prior structure 301 that relies on the electrowetting principles described above to move a droplet of conductive fluid 302 through an enclosure 309 that is, for example, a glass tube of circular cross section. Such an embodiment is the subject of copending U.S. patent application Ser. No. 10/231,614, entitled "Optical Waveguide Devices With Electro-Wetting Actuation" which is also hereby incorporated by reference herein in its entirety. In contrast to FIG. 2, the embodiment of FIG. 3 uses a rigid enclosure around a conducting liquid droplet 302 to entirely constrain the movement of the droplet in all directions except for the x-direction. In the embodiment of FIG. 3 the droplet is constrained, illustratively, by a tube of circular cross-section. Electrowetting principles, such as those described above, are used to reversibly change the contact angle θ between the liquid and the surface of enclosure 309. The contact angle θ between the droplet and the insulating layer is, once again, determined by interfacial surface tensions and can be calculated by referring to equation 1. When no voltage difference is present between the droplet 302 and the electrode 305, the droplet 302 maintains its position within the enclosure 309 with contact angle $\theta_1 = \theta_2$ where $\theta_1$ is determined by the interfacial tensions γ as explained above.

When a voltage V is applied to the electrode 305, the voltage difference between the electrode 305 and the droplet 302 causes the droplet to attempt to spread, as in the case represented by FIG. 2. Specifically, the contact angle where boundary 303A meets the surface of enclosure 309 decreases from $\theta_2$ to $\theta_1$ when the voltage is applied between the electrode 305 and the droplet 302. The voltage V necessary to achieve this change may range from several volts to several hundred volts. The amount of movement, i.e., as determined by the difference between $\theta_1$ and $\theta_2$, is a function of the applied voltage V. The contact angle $\theta_2$ can be determined by, once again, referring to equation 2, where $\theta_1$ is the contact angle between the surface of enclosure 309 and the droplet 302 when no voltage is applied between the droplet 302 and electrode 305; $\gamma_{L-V}$ is the droplet interfacial tension; $\epsilon_r$ is the dielectric constant of the insulating layer 306; and $\epsilon_0$ is $8.85 \times 10^{-12}$ F/M—the permittivity of a vacuum. Since the droplet of FIG. 3 is constrained in its movement in all directions except the x-direction, a difference in contact angle caused by the applied voltage V leads to a force imbalance between the opposite sides 303A and 303B of the fluid droplet. As a result, the fluid droplet moves in direction 310 toward the side of the droplet under higher applied voltage.

Figure 4A:
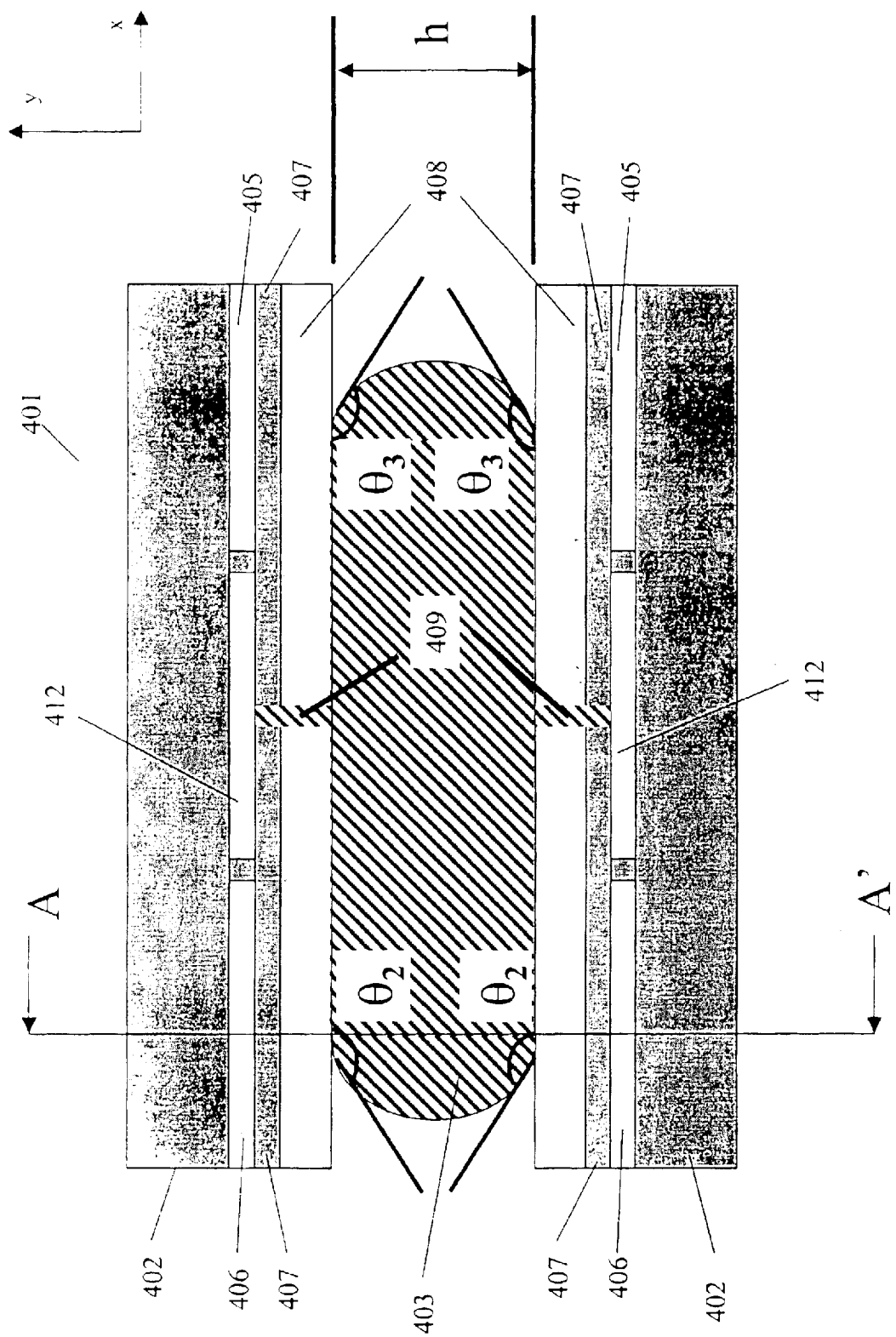
FIG. 4A shows a side view of a beamsplitter in accordance with the principles of the present invention wherein a droplet is enclosed within a channel and is movable using electrowetting techniques.
Figure 4B:
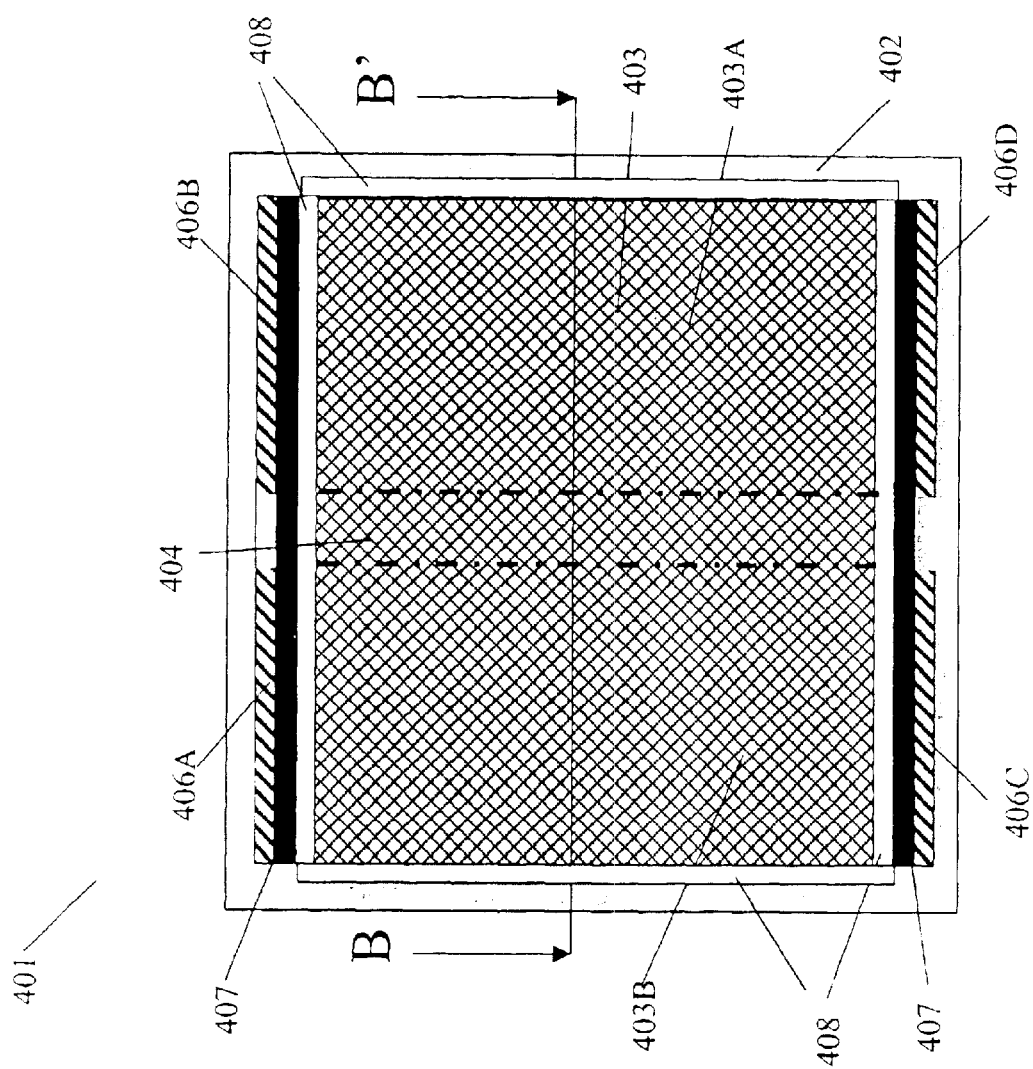
FIG. 4B shows a cross sectional view of the beamsplitter of FIG. 4A representing the view at plane A–A' in FIG. 4A.
Figure 4C:
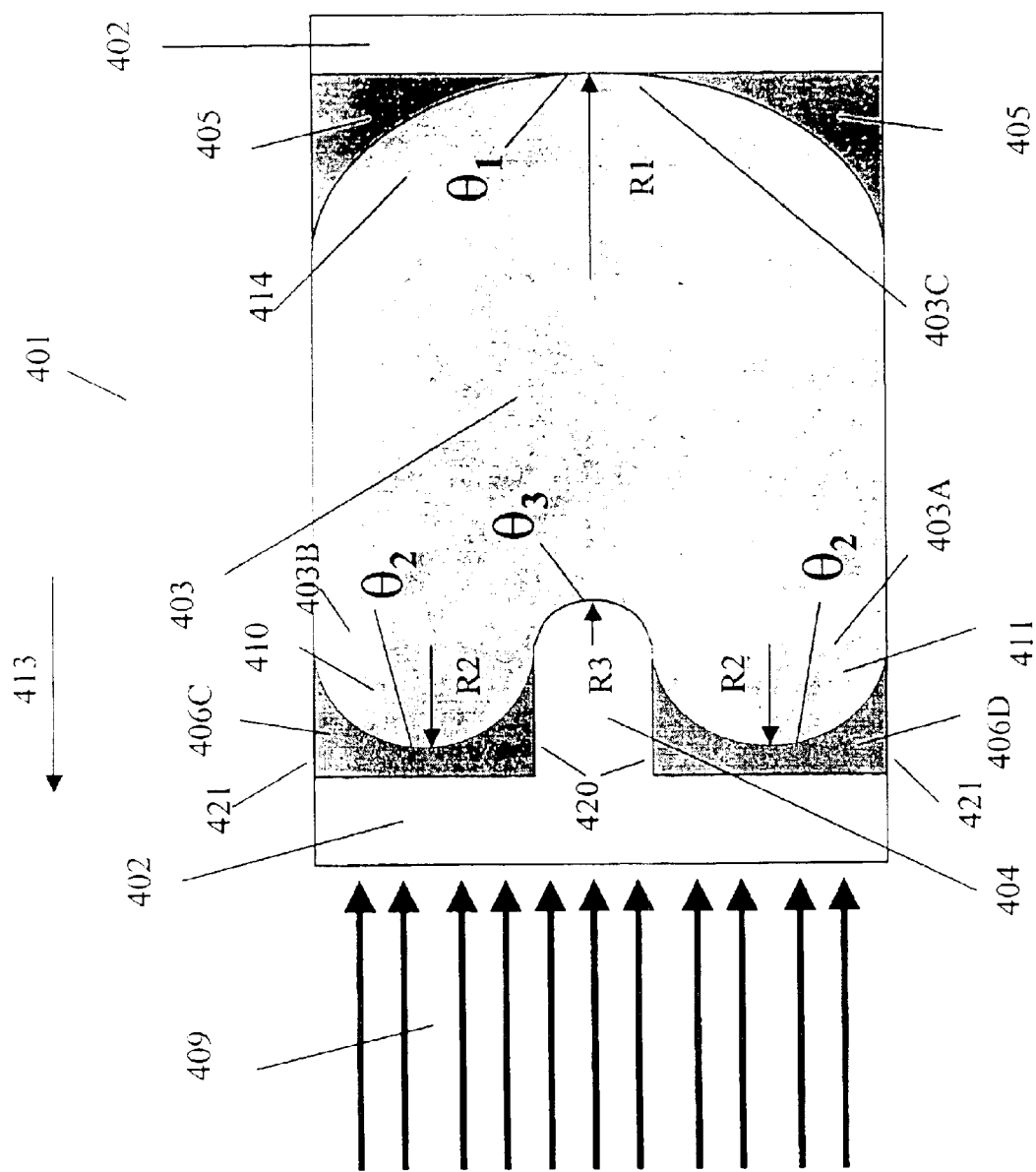
FIG. 4C shows the cross-sectional view of the beamsplitter of FIGS. 4A and 4B representing the view at plane B–B' in FIG. 4B.

The present inventors have realized that it would be advantageous to utilize the aforementioned electrowetting techniques to create a tunable beamsplitter. Therefore, in accordance with the principles of the present invention, FIGS. 4A, 4B and 4C show, respectively, a side cross sectional view, a front cross-sectional view and a top cross-sectional view of a beamsplitter 401 that controls fluid motion via electrowetting principles. In this embodiment, referring to FIG. 4A, droplet 403 is disposed within an illustrative enclosure 402 having reflective inner surface 408 which is, illustratively, a layer of reflective dielectric material. A lubricating liquid may be disposed within the enclosure 402 to reduce friction between droplet 403 and enclosure 402. Surface 408 may have, illustratively a transparent coating of CYTOP® disposed on a substrate of well-known Teflon® material. CYTOP® is an amorphous fluorocarbon polymer manufactured by Asahi Glass, Inc. that is characterized, in part, advantageous hydrophobic properties. One skilled in the art will recognize that many materials will be suitable to achieve the characteristics necessary for surfaces in beamsplitters such as that described herein. Enclosure 402 is illustratively of rectangular cross section, however one skilled in the art will similarly recognize that many cross sectional shapes (e.g., ellipsoidal) would be equally advantageous. Electrodes 405 and 406, located above and below droplet 403, respectively, are separated by dielectric layer 407 from droplet 403. Channels 409 in the dielectric layer 407 permit grounding of the liquid droplet by bringing the liquid into contact with ground electrodes 412. As previously discussed, by changing the relative voltages of electrodes 406 and 405, one or more portions of droplet 403 can be moved in the x-direction within enclosure 402. The contact angles $\theta_2$ and $\theta_3$, which are herein after referred to as the vertical contact angles of, respectively, the leading and trailing edge of the droplet can, once again, be determined by equations 1 and 2.

FIG. 4B shows a cross-section of the beamsplitter of FIG. 4A. Specifically, FIG. 4B represents an illustrative cross section of beamsplitter 401 at plane A–A' as shown in FIG. 4A. In FIG. 4B it can be seen that, unlike previous embodiments of moving a droplet within an enclosure, electrodes 406A/C and 406B/D only extend partially across the width of the droplet 403. Thus, droplet 403 is divided into portions 403A and 403B separated by region 404, hereinafter referred to as transition region 404.

FIG. 4C shows a top cross-sectional view of the beamsplitter of FIG. 4A used to split illustrative light beam 409 into multiple light beams. Specifically, FIG. 4C represents an illustrative cross section of beamsplitter 401 at plane B–B' as shown in FIG. 4B. In the illustrative embodiment of FIG. 4C, when an equal voltage is applied to electrodes 406C (and/or 406A as shown in FIG. 4B) and 406D (and/or 406B as also shown in FIG. 4B), portions 403A and 403B of droplet 403 are caused to move in direction 413. Thus, for a given voltage applied to electrodes 406C (and/or 406A as shown in FIG. 4B) and 406D (and/or 406B as also shown in FIG. 4B), it can be said that portions 403A and 403B form two lenses 411 and 410, respectively, having radius of curvature R2. As will be apparent to one skilled in the art from the forgoing discussion of electrowetting, the amount of displacement of droplet portions 403A and 403B (and hence the radius of curvature of lenses 411 and 410) depends directly on the amount of voltage applied to electrodes 406C (and/or 406A as shown in FIG. 4B) and 406D (and/or 406B as also shown in FIG. 4B). Transition region 404 with radius of curvature R3 serves to divide the droplet to create two portions 403A and 403B of droplet 403. This transition region results from the lack of voltage applied to the droplet in the transition region 404 between electrodes 406C and 406D. The lack of electrodes in the transition region 404 creates a high vertical contact angle $\theta_3$. As a result, the droplet on either side of region 404 forms two lenses having a semi-circular cross-section with, illustratively, the maximum displacement of the lens being positioned at the midpoint between the boundaries 420 of the transition region 404 and the sidewalls 421. The radii of curvature R1, R2, and R3 depend, respectively, on the vertical contact angles $\theta_1$, $\theta_2$ and $\theta_3$. Specifically, the radius of curvature R3 of the transition area on the leading edge of the droplet depends on the radius of curvature R1 of the trailing edge of the droplet, the contact angle $\theta_1$ of the trailing edge and the contact angle $\theta_3$ of the transition region. The radius of curvature R3 of the transition area 404 and can be expressed as:

$$R3 = \frac{h}{2(\cos\theta_1 - \cos\theta_3)} - R1 \quad (3)$$

where h is the height of the enclosure as shown in FIG. 4A. Similarly, the radius of curvature R2 of the lenses 410 and 411 in FIG. 4C can be determined by:

$$R2 = R1 - \frac{h}{2(\cos\theta_1 - \cos\theta_2)}. \quad (4)$$

Thus, by using the previously described electrowetting techniques to vary the vertical contact angles $\theta_1$, $\theta_2$ and $\theta_3$, the radii of curvature R1, R2 and R3 can be changed, or tuned.

One skilled in the art will recognize that, although two lenses (lenses 411 and 410) are shown in this exemplary embodiment, by arranging the electrodes differently (e.g., by adding additional electrodes separated from each other) it will be possible to create any number of lenses separated by transition regions such as region 404. Referring once again to the illustrative embodiment of FIG. 4C, electrode 405 is used, by relying once again on electrowetting principles, to form region 403C of droplet 403 which thus forms a third lens 414 having radius R1. The portion of the surface of droplet 403 where lenses 410 and 411 are formed is hereinafter referred to as a first surface of the droplet and the portion of the surface of the droplet 403 where lens 414 is formed is hereinafter referred to as a second surface of the droplet.

Figure 5:
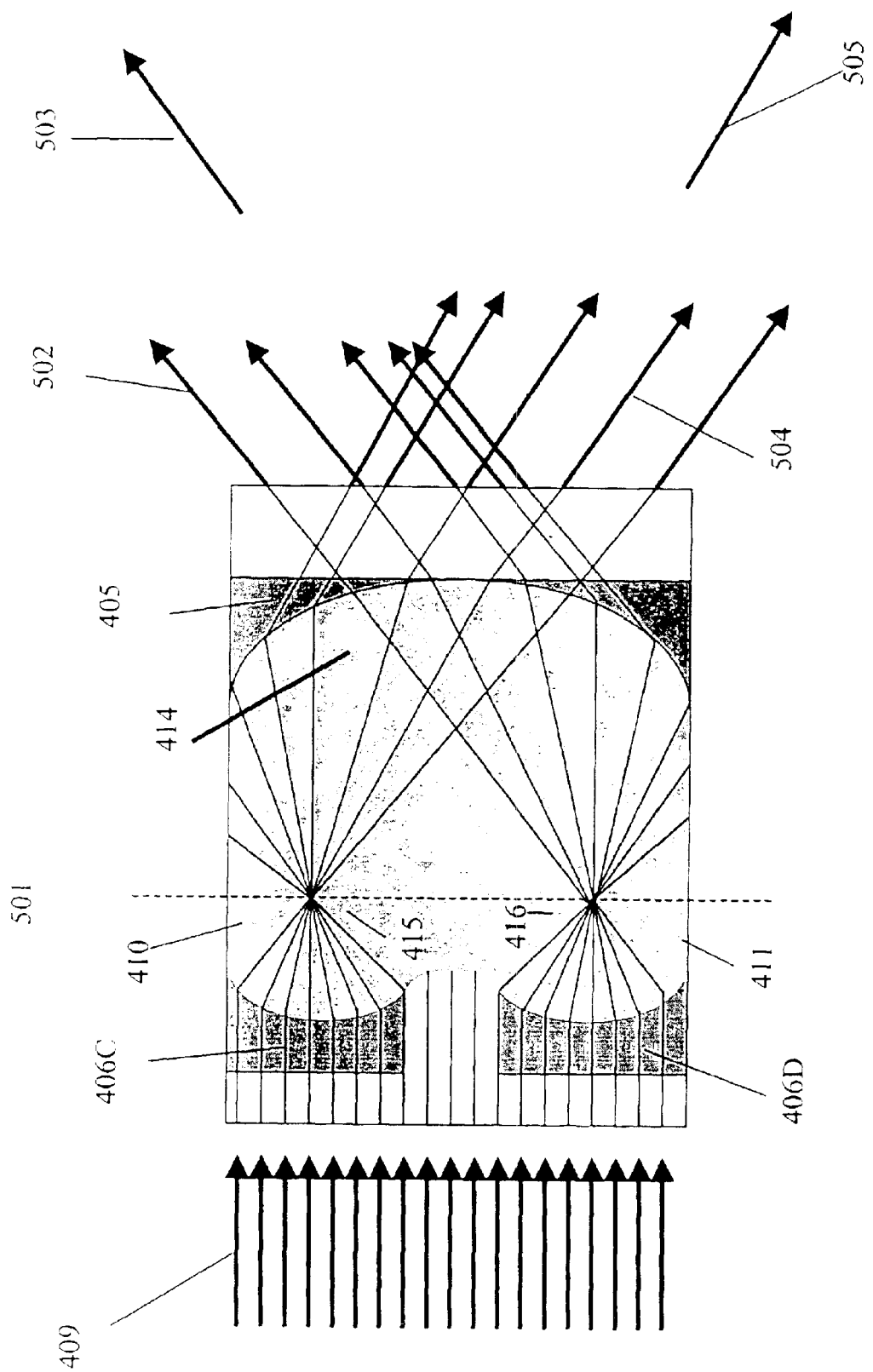
FIG. 5 shows how the beamsplitter of FIGS. 4A, 4B and 4C operates to split an incoming light beam into multiple split light beams.

FIG. 5 shows how the beamsplitter of FIGS. 4A, 4B and 4C may be used operationally to split incoming beam 409 into illustrative multiple beams 503 and 505. Specifically, the radii of curvature (R2 in FIG. 4C) of lenses 410 and 411 are selected using the above-discussed electrowetting techniques in a way such that, when light beam 409 is incident upon those lenses they operate to focus a portion of beam 409 onto different focal points, 415 and 416 respectively, within focal plane 501. The focal length f of lenses 410 and 411 is determined by the equation:

$$f = \left[\frac{R}{n_{lens} - n_{surround}}\right] \cdot n_{lens} \quad (5)$$

where R is the radius of the lens, $n_{lens}$ is the refractive index of the lens, and $n_{surround}$ is the refractive index of the medium surrounding the lens. The two resulting split beams with focus points 415 and 416 propagate through the liquid until reaching lens 414 which functions to direct split output beams 502 and 504 in desired directions, such as directions 503 and 505, respectively. Focal plane 501, hereinafter referred to as the main lens focal plane, is the focal plane of lens 414. Setting the focal points 415 and 416 of lenses 410 and 411 to be within in focal plane 501 leads to the result that the output beams 502 and 504 are parallel beams (i.e., not converging or diverging beams). Thus, parallel output beams may be achieved by adjusting the radius of curvature of lenses lenses 410 and 411 with the electrowetting techniques discussed herein above.

Figures 6A, 6B, 6C:
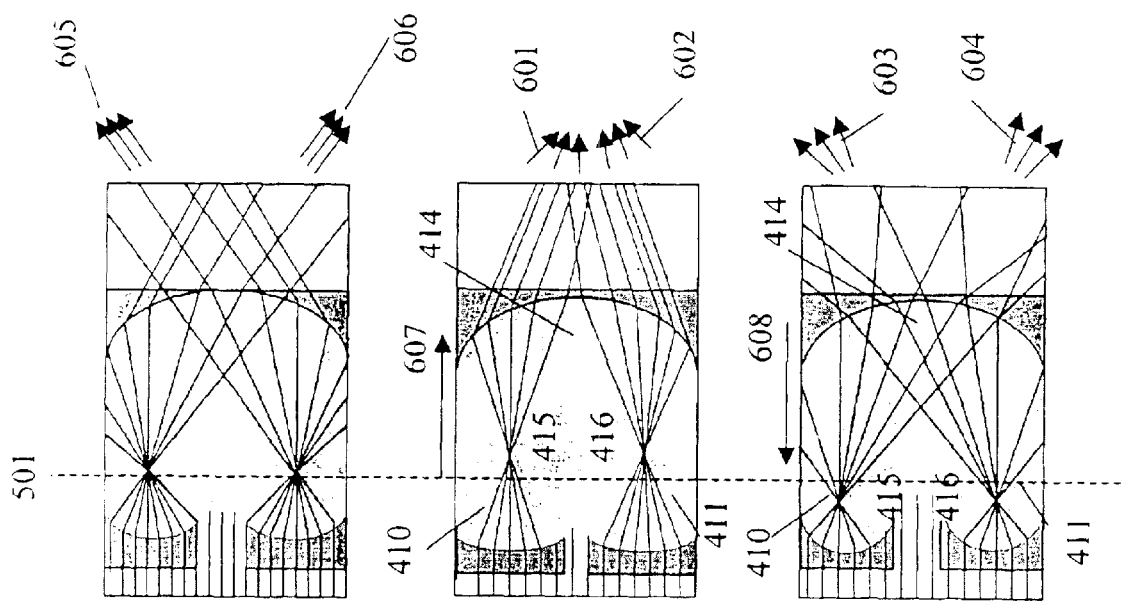
FIG. 6 shows how the beamsplitter of FIGS. 4A, 4B and 4C can be adjusted to vary the divergence of the split light beams.

FIGS. 6A, 6B and 6C illustrates how, by tuning the characteristics of the liquid droplet 403, such as tuning the radius of curvature as discussed in association with FIG. 4C, the optical characteristics of the lenses, such as lenses 410 and 411, and hence the propagating characteristics of the split beams, may be varied. Specifically, as shown in FIG. 6A (which is similar to the beamsplitter of FIG. 5), when the radius of curvature (R2 in FIG. 4C) of lenses 410 and 411 is such that the focus points 415 and 416 are located at the main lens focal plane 501, the output beams 605 and 606 are parallel beams. However, as is shown in FIGS. 6B and 6C, by changing the radius of curvature of lenses 410 and 411 (e.g., by varying the vertical contact angles of the droplet 403), the convergence or divergence of the output beams can be changed. Alternatively, the same convergence or divergence may be obtained by changing the radius of curvature of lens 414 in FIG. 4C. This may be desirable, for example, in achieving alignment between the beamsplitter and other optical components or, alternatively, to increase or decrease the power of the resulting split beams. In the illustrative embodiment of FIG. 6B, the radius of curvature of the lenses 410 and 411 is increased relative to the radius of curvature in FIG. 6A and, accordingly, the focal length of the lenses (as determined by equation 5) is also increased. The result is that the focal points 415 and 416 are moved in direction 607 away from the main lens focal plane 501. The same result (displacement of the focal points 415 and 416 relative to the focal plane 501) may be achieved by decreasing the radius of curvature of lens 414. As a result, as is shown by output beams 601 and 602, the output beams converge as they propagate to a destination. Conversely, as is shown in FIG. 6C, when the radius of curvature of lenses 410 and 411 are decreased relative to the radius of curvature in FIG. 6A, the focal length of the lenses is decreased. Therefore, in this case, the focal points 415 and 416 are moved in direction 608 away from the main lens focal plane 501. Once again, the same result could be achieved by increasing the radius of curvature of lens 414. Therefore, as is shown by output beams 603 and 604, the output beams diverge as they propagate to a destination.

Figure 7:
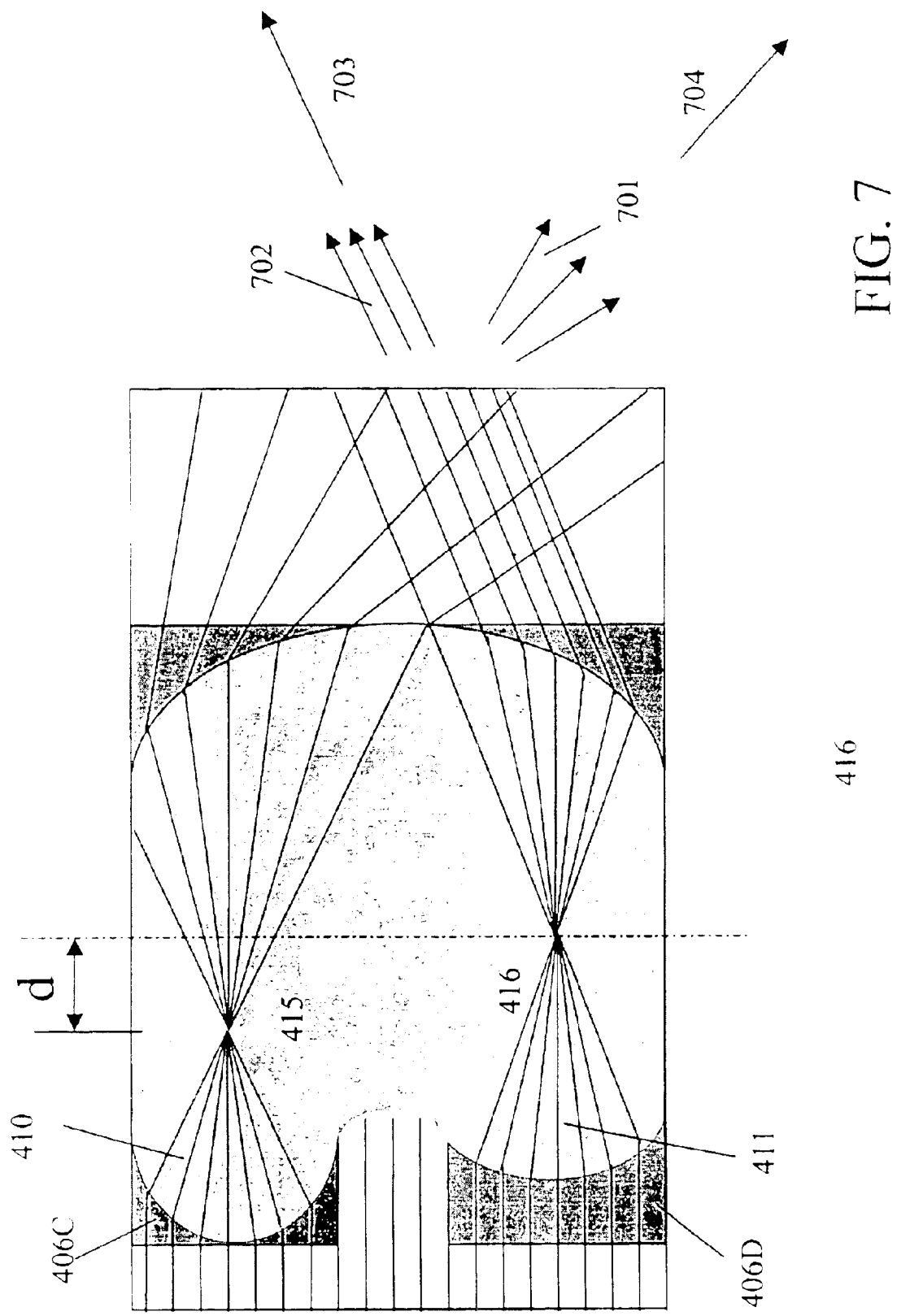
FIG. 7 shows how the beamsplitter of FIGS. 4A, 4B and 4C can be adjusted to vary the divergence of individual split light beams independent of the other split beams.

In the above discussion, the radius of curvature R2 of lenses 410 and 411 have been assumed to be equal. However, as is shown in FIG. 7, it is possible to use electrowetting techniques to adjust the droplet 403 in a way such that the radius of curvature for each of the two lenses is different. Specifically, in this illustrative embodiment, a higher voltage is applied to electrode 406C (and electrode 406A in FIG. 4B) than is applied to electrode 406D (and electrode 406B in FIG. 4B). As a result, the radius of curvature of lens 410 is lower than the radius of curvature of lens 411, thus causing the focus point 415 of lens 410 to be a distance d from the main lens focal plane 501 closer to lens 410. In this illustrative example, the radius of curvature of lens 411 is such that the focus point 416 is located in the main lens focal plane 501. As a result, output beam 702 is a parallel beam propagating in direction 703, while output beam 701 is a diverging beam propagating in direction 704. As discussed previously, it is desirable to be able to adjust the split beams independent of one another in order to, for example, adjust the power per unit area of an individual split beam.

Finally, FIGS. 8A and 8B illustrate another method of tuning the propagation characteristics of the output split beams. Specifically, by using an array 804 of electrodes, as opposed to a single electrode (such as 406D in FIG. 7), it is possible to vary the angle of departure and/or the intensity (power) of the output beam. Referring to FIGS. 8A and 8B, this variation is accomplished by only applying a voltage to a portion of the electrodes in array 804. As such, a smaller portion of droplet 403 is displaced in direction 809, thus forming lens 805. One skilled in the art will recognize that this smaller lens will focus a smaller portion of the light beam entering the beamsplitter from direction 801 as compared to, for example, lens 810. As a result, the power of output split beam 807 will be correspondingly lower. Also, since the smaller lens 805 is displaced away from transition region 404, the resulting output beam 807 propagating in direction 802 will have a departure angle of $\theta_D$. As is illustrated in FIG. 8B, when lens 805 is displaced in the opposite direction, closer to the transition region 404, the departure angle $\theta_D$ of output beam 808 propagating in direction 803 decreases when compared to the lens location of FIG. 8A. Once again, as previously discussed, since the focus point 415 is located in the main lens focal plane 501, the output beams 807 and 808 are parallel beams.

The foregoing merely illustrates the principles of the invention. It will thus be appreciated that those skilled in the art will be able to devise various arrangements which, although not explicitly described or shown herein, embody the principles of the invention and are within its spirit and scope. Furthermore, all examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

We claim:

1. Apparatus comprising:
   a droplet of conductive liquid disposed in an enclosure adapted to contain said droplet; and
   means for forming a plurality of liquid lenses on at least a first surface of said droplet of conducting liquid.

2. The apparatus of claim 1 wherein said means for forming comprises a plurality of electrodes disposed in a way such that, in response to at least a first voltage being applied to said plurality of electrodes, a plurality of liquid lenses is formed on at least a first surface of said droplet of conducting liquid.

3. The apparatus of claim 2 wherein wherein each electrode in said plurality of electrodes is disposed in said enclosure and are electrically insulated from other electrodes in said plurality of electrodes.

4. The apparatus of claim 2 wherein said plurality of electrodes is disposed in a way such that said plurality of liquid lenses is formed in response to at least a second voltage.

5. The apparatus of claim 4 wherein said first voltage is the same as said second voltage.

6. An optical beamsplitter comprising:
   a droplet of conductive liquid disposed in an enclosure adapted to contain said droplet; and
   a plurality of electrodes disposed in a way such that, in response to at least a first voltage being applied to said plurality of electrodes, a plurality of liquid lenses is formed on at least a first surface of said droplet of conducting liquid.

7. The optical beamsplitter of claim 6 wherein each electrode in said plurality of electrodes is disposed in said enclosure and are electrically insulated from other electrodes in said plurality of electrodes.

8. The optical beamsplitter of claim 6 wherein said plurality of electrodes is disposed in a way such that said plurality of liquid lenses is formed in response to at least a second voltage.

9. A method for splitting an optical beam, said method comprising:

applying at least a first voltage to a plurality of electrodes, thus forming a plurality of liquid lenses on at least a first surface of a droplet of conducting liquid; and receiving a light beam in a way such that said beam is incident upon at least one lens in said plurality of liquid lenses.

10. The method of claim 9 further comprising applying a second voltage to said plurality of electrodes.

11. The method of claim 10 wherein said first voltage is the same as said second voltage.

* * * * *